United States Patent
Pan (10) Patent No.: US 11,827,504 B2
(45) Date of Patent: Nov. 28, 2023

(54) AUTOMATIC STOP METHOD AND DEVICE FOR CAN OPENER

(71) Applicant: X. J. Electrics (Shenzhen) Co., Ltd., Shenzhen (CN)

(72) Inventor: Yun Pan, Shenzhen (CN)

(73) Assignee: X. J. Electrics (Shenzhen) Co., Ltd., Shenzhen (CN)

( * ) Notice: Subject to any disclaimer, the term of this patent is extended or adjusted under 35 U.S.C. 154(b) by 203 days.

(21) Appl. No.: 17/140,271

(22) Filed: Jan. 4, 2021

(65) Prior Publication Data
US 2022/0194770 A1    Jun. 23, 2022

(30) Foreign Application Priority Data

Dec. 17, 2020    (CN) .......................... 202011497209.5

(51) Int. Cl.
| | |
|---|---|
| B67B 7/00 | (2006.01) |
| B67B 7/46 | (2006.01) |
| G05D 19/02 | (2006.01) |

(52) U.S. Cl.
CPC .......... *B67B 7/38* (2013.01); *B67B 2007/303* (2013.01); *G05D 19/02* (2013.01)

(58) Field of Classification Search
CPC .... B67B 7/38; B67B 2007/303; G05D 19/02; G05D 13/00; G05B 15/02; G01P 13/00; B26D 7/24
See application file for complete search history.

(56) References Cited

U.S. PATENT DOCUMENTS

| | | | | |
|---|---|---|---|---|
| 7,574,808 | B2 * | 8/2009 | Mah ......................... | B67B 7/32 30/422 |
| 10,739,797 | B2 * | 8/2020 | Keegan .................. | G05D 19/02 |
| 2007/0180712 | A1 * | 8/2007 | Mah ........................ | B67B 7/385 30/418 |
| 2019/0129453 | A1 * | 5/2019 | Keegan .................. | G05D 19/02 |

FOREIGN PATENT DOCUMENTS

| | | | | | |
|---|---|---|---|---|---|
| CN | 104261329 | A | * | 1/2015 | ............... B67B 7/38 |
| CN | 106672875 | A | * | 5/2017 | |
| CN | 112777546 | A | * | 5/2021 | ............... B67B 7/38 |
| CN | 112850610 | A | * | 5/2021 | ............... B67B 7/38 |
| CN | 214059842 | U | * | 8/2021 | ............... B67B 7/38 |
| CN | 217148520 | U | * | 8/2022 | |
| KR | 20080004162 | U | * | 9/2008 | ............... B67B 7/32 |

* cited by examiner

*Primary Examiner* — Laura M Lee
(74) *Attorney, Agent, or Firm* — Westbridge IP LLC (57) ABSTRACT

The invention provides an automatic stop method and device for a can opener. When a first rotation frequency of a bearing in a first preset time is smaller than a second rotation frequency of the bearing in a subsequent second preset time in the process of opening a can by a can opener blade and a difference between the second and first frequency reaches a preset value, it is determined that repeated cutting occurs, and the blade will be stopped in time to avoid problems caused by repeated cutting. Meanwhile, mean values of multiple data acquired within the first and second preset time are calculated, avoiding the problems of an excessively high and long instant processing burden of one time of data acquisition and errors caused by data acquired once, improving the timeliness and accuracy of the first and second frequency, and can opening can be controlled more accurately.

9 Claims, 5 Drawing Sheets

AUTOMATIC STOP METHOD AND DEVICE FOR CAN OPENER

CROSS-REFERENCE TO RELATED APPLICATIONS

The application claims priority to Chinese patent application CN 202011497209.5, filed on Dec. 17, 2020, the entire contents of which are incorporated herein by reference.

TECHNICAL FIELD

The invention relates to the technical field of electronic product design, in particular to an automatic stop method and device for a can opener.

BACKGROUND

In the prior art, there are two types of electric can openers, namely, top-cut can openers and lateral-cut can openers.

The top-cut can opener is characterized in that a can opener blade pierces and penetrates into a can to directly contact with food in the can and cuts a sharp opening in the can. When a motor drives the can opener blade to rotate by one complete circle, a can lid is separated from a can body, and the can opener blade springs together with the lid to restore and drives a mechanical switch to cut off power supplied to the motor of the can opener, so as to automatically stop the can opener.

The lateral-cut can opener is characterized in that a can opener blade cuts a sealing or covering edge of a can laterally and will not contact with food in the can, and an opening cut in the can is regular. However, when the motor rotates by one complete circle, a motor switch will not be automatically turned off due to the lack of a drive mechanism, and consequentially, the motor of the lateral-cut can opener cannot stop automatically. If users fail to stop the lateral-cut can opener in time, sharp scrap iron and burrs will be caused by repeated cutting of the edge.

SUMMARY

The technical issue to be settled by the invention is to provide an automatic stop method and device for a can opener to ensure that a lateral-cut can opener can open a can without problems caused by repeated cutting.

To settle the aforesaid technical issue, the technical solution adopted by the invention is as follows:

An automatic stop method for a can opener comprises the following steps:

S1: starting a can opener, acquiring multiple rotation frequencies of a bearing within a first preset time, calculating a mean value of the multiple rotation frequencies, and regarding the mean value as a first frequency, wherein the bearing is used for driving a can opener blade to rotate;

S2: acquiring multiple rotation frequencies of the bearing within each second preset time after the first preset time, calculating a mean value of the multiple rotation frequencies, and regarding the mean value as a second frequency; and S3: determining whether or not a difference between the second frequency and the first frequency is greater than a preset value; if so, stopping the can opener blade; or if not, performing Step S2.

To settle the aforesaid technical issue, another technical solution adopted by the invention is as follows:

An automatic stop device for a can opener comprises a control module, a photo-interrupter, a grating wheel, a power supply module, a bearing drive module provided with a bearing, and a can opener blade.

The control module is electrically connected to the power supply module, the bearing drive module and the photo-interrupter; the power supply module is electrically connected to the bearing drive module and the photo-interrupter; the grating wheel is disposed around the bearing, and the movement track of the grating wheel passes through a photoelectric detection region of the photo-interrupter; the bearing is fixedly connected to the can opener blade.

The bearing drives the grating wheel to rotate, and the control module is used to implement an automatic stop method for a can opener according to Steps S1 to S3.

To sum up, the invention has the following beneficial effects: according to the automatic stop method and device for a can opener, when a first rotation frequency of the bearing in a first preset time is smaller than a second rotation frequency of the bearing in a subsequent second preset time in the process of opening a can by the can opener blade and the difference between the second frequency and the first frequency reaches a preset value, it is determined that repeated cutting occurs, and at this moment, the blade will be stopped in time to avoid problems caused by repeated cutting. Meanwhile, mean values of multiple data acquired within the first preset time and the second preset time are calculated, so that the problems of an excessively high instant processing burden and an excessively long time of one time of data acquisition and errors caused by data acquired once are avoided, the timeliness and accuracy of the first frequency and the second frequency are improved, and can opening can be controlled more accurately.

DETAILED DESCRIPTION OF THE EMBODIMENTS

The technical contents, purposes and effects of the invention will be described in detail below in conjunction with the embodiments and accompanying drawings.

Figure 1:
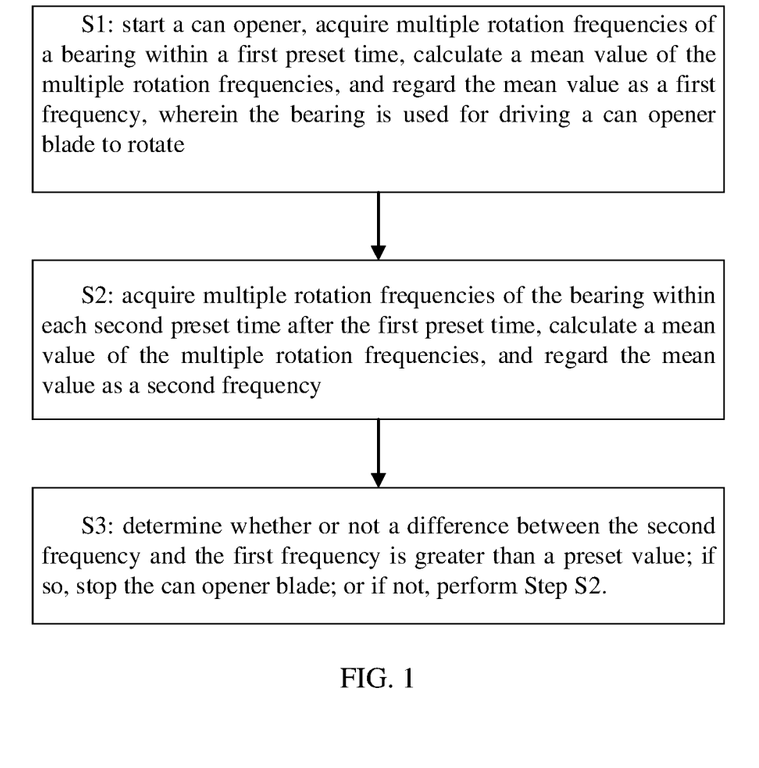
FIG. 1 is a schematic diagram of the steps of an automatic stop method for a can opener, according to one embodiment of the invention.

Referring to FIG. 1, an automatic stop method for a can opener comprises the following steps:

S1: a can opener is started, multiple rotation frequencies of a bearing 6 are acquired within a first preset time, and a mean value of the multiple rotation frequencies is calculated and is regarded as a first frequency, wherein the bearing 6 is used for driving a can opener blade to rotate;

S2: multiple rotation frequencies of the bearing 6 are acquired within each second preset time after the first preset time, and a mean value of the multiple rotation frequencies is calculated and is regarded as a second frequency; and S3: whether or not a difference between the second frequency and the first frequency is greater than a preset value is determined; if so, the can opener blade is stopped; or if not, Step S2 is performed.

From the above description, the invention has the following beneficial effects: according to the automatic stop method for a can opener, when a first rotation frequency of the bearing 6 in a first preset time is smaller than a second rotation frequency of the bearing 6 in a subsequent second preset time in the process of opening a can by the can opener blade and the difference between the second frequency and the first frequency reaches a preset value, it is determined that repeated cutting occurs, and at this moment, the blade will be stopped in time to avoid problems caused by repeated cutting. Meanwhile, mean values of multiple data acquired within the first preset time and the second preset time are calculated, so that the problems of an excessively high instant processing burden and an excessively long time of one time of data acquisition and errors caused by data acquired once are avoided, the timeliness and accuracy of the first frequency and the second frequency are improved, and can opening can be controlled more accurately.

Furthermore, the preset vale is obtained specifically as follows:

When the can opener blade is used to open different cans, first rotation frequencies of the bearing 6 during primary cutting and second rotation frequencies of the bearing 6 during repeated cutting are acquired, and a difference between the first rotation frequency and the second rotation frequency corresponding to each can is calculated to obtain a frequency difference corresponding to each can.

A mean value of all frequency differences is calculated and is multiplied by a preset coefficient to obtain the preset value, wherein the range of the preset value is (0,1).

From the above description, the preset value is obtained in advance. First rotation frequencies and second rotation frequencies of the bearing when the can open blade is used to open different cans are acquired, differences between the first rotation frequencies and the second rotation frequencies are calculated to obtain a frequency difference corresponding to each can, and a mean value of the frequency differences corresponding to all the cans is obtained to be used as an evaluation criterion of the difference between the first frequency and the second frequency obtained when the can opener opens a can, so as to determine whether or not repeated cutting occurs. Wherein, by multiplying the mean value of the frequency differences by the preset coefficient, a time period during which repeated cutting occurs can be found out more accurately when the second rotation frequencies are acquired in the second preset time, thus improving the reliability of data.

Furthermore, in Step S1, the can opener is started specifically through the following sub-steps:

Whether or not a key switch S1 is constantly in an on state within a third preset time is determined; if so, the can opener blade is driven to rotate, and a rotation time is recorded.

After Step S3, the method further comprises the following step:

S4: whether or not the rotation time is greater than a maximum can opening cycle is determined; if so, the can opener blade is stopped, wherein the maximum can opening cycle is greater than the sum of the first preset time and the second preset time.

From the above description, when the key switch S1 on the can opener is long pressed by a user for a third preset time, the can opener blade will start to rotate, and the rotation time of the can opener blade is calculated; then, Step S1 to Step S3 are performed. When the rotation time of the can opener blade reaches the maximum can opening cycle, the can opener blade will stop even if the key switch S1 is still pressed by the user, so that the problems caused by repeated cutting are avoided.

Furthermore, if the maximum can opening cycle is T, the first preset time is (0, T/4], and the second preset time is (0, T/10].

From the above description, when the can opener opens a can, any one time period (0, T/4] is selected from the maximum can opening cycle T to serve as the first preset time, any one time period (0, T/10] is selected from the remaining time to serve as the second preset time, and the second preset time is shorter than the first preset time, so that after the first preset time passes by, an interval of the second preset time can be specified to more accurately find out a time interval during which repeated cutting of the can opener blade occurs from the remaining time of T.

Furthermore, Step S1 specifically comprises:

S1: the can opener is started, the first preset time is divided into multiple equal first preset intervals, the rotation frequency of the bearing 6 is acquired in each first preset interval, and a mean value of all acquired rotation frequencies, except the maximum one and the minimum one, of the bearings 6 is calculated to obtain the first frequency, wherein the bearing 6 is used for driving the can opener blade to rotate, and the rotation frequency of the bearing 6 acquired in each first preset interval is a constant value or a mean value of multiple rotation frequencies.

Step S2 specifically comprises:

S2: each second preset time after the first preset time is divided into multiple equal second preset intervals, the rotation frequency of the bearing 6 is acquired in each second preset interval, and a mean value of all acquired rotation frequencies of the bearing 6 is calculated to obtain the second frequency, wherein the rotation frequency of the bearing 6 acquired in each second preset interval is a constant value or a mean value of multiple rotation frequencies.

From the above description, to improve the accuracy of acquired data, the first preset time and the second preset time are divided into equal time intervals, and a constant value or a mean value of multiple rotation frequencies acquired in each interval is obtained. In addition, the mean value of all the rotation frequencies, except the maximum one and the minimum one, of the bearing 6 acquired within the first preset time is calculated, so that the first frequency is more accrete.

Referring to FIG. 2 to FIG. 8, an automatic stop device for a can opener comprises a control module 1, a photo-interrupter 2, a grating wheel 3, a power supply module 4, a bearing drive module 5 provided with a bearing 6, and a can opener blade.

The control module 1 is electrically connected to the power supply module 4, the bearing drive module 5 and the photo-interrupter 2, the power supply module 4 is electrically connected to the bearing drive module 5 and the photo-interrupter 2, the grating wheel 3 is disposed around the bearing 6, the movement track of the grating wheel 3 passes through a photoelectric detection region of the photo-interrupter 2, and the bearing 6 is fixedly connected to the can opener blade.

The bearing 6 drives the grating wheel 3 to rotate, and the control module 1 is used to implement an automatic stop method for a can opener according to Steps S1 to S3.

From the above description, the invention has the following beneficial effects: according to the automatic stop device for a can opener, when a first rotation frequency of the bearing 6 in a first preset time is smaller than a second rotation frequency of the bearing 6 in a subsequent second preset time in the process of opening a can by the can opener blade and the difference between the second frequency and the first frequency reaches a preset value, it is determined that repeated cutting occurs, and at this moment, the blade will be stopped in time to avoid problems caused by repeated cutting.

Figure 3:
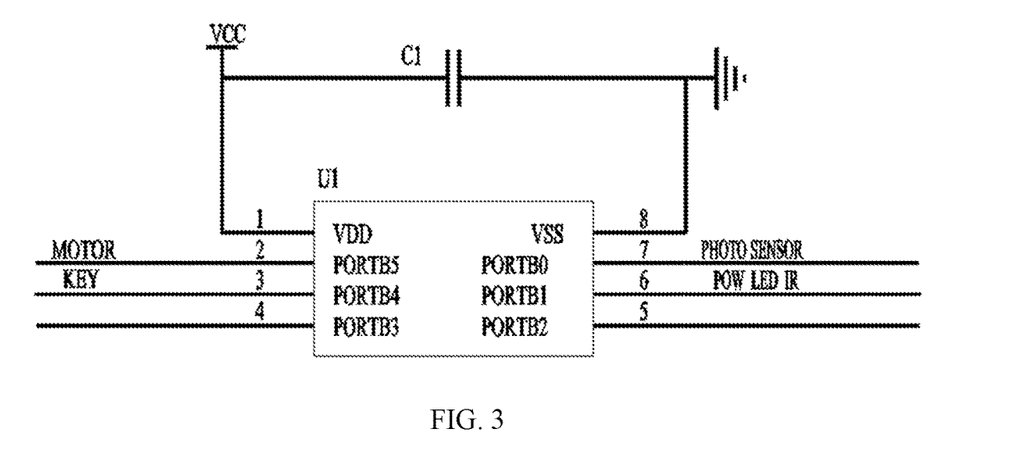
FIG. 3 is a circuit diagram of a control module of the automatic stop device for a can opener, according to one embodiment of the invention.

Furthermore, the control module 1 comprises a main control chip U1 and a first capacitor C1.

One terminal of the first capacitor C1 is connected to a supply voltage input pin of the main control chip U10 and a supply terminal of the power supply module 4, and the other terminal of the first capacitor C1 is connected to a ground pin of the main control chip U1.

The main control chip U1 and a peripheral circuit thereof on the control module 1 are described above. The first capacitor C1 is used for filtering.

Figure 4:
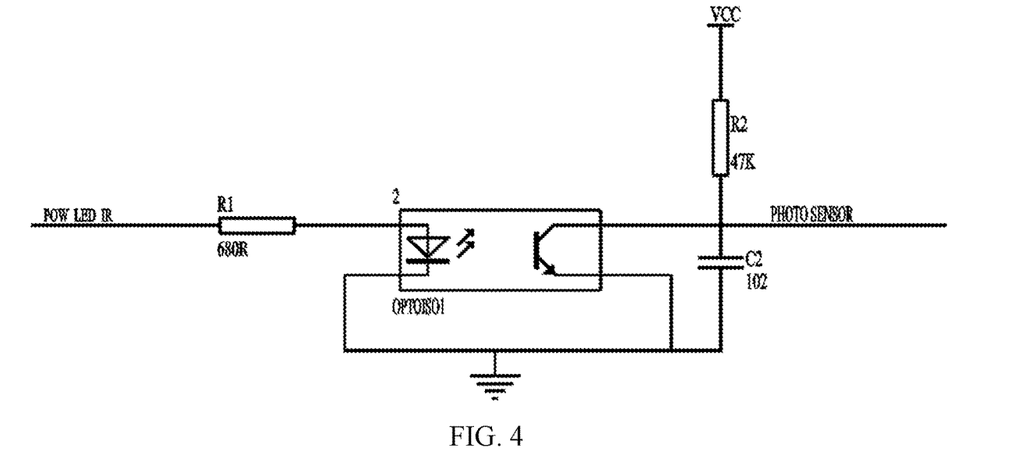
FIG. 4 is a schematic diagram of a photo-interrupter and a peripheral circuit thereof of the automatic stop device for a can opener, according to one embodiment of the invention.

Furthermore, the automatic stop device further comprises a first resistor R1, a second resistor R2 and a second capacitor C2.

One terminal of the first resistor R1 is connected to a first serial input-output port of the main control chip U1, and the other terminal of the first resistor R1 is connected to a positive pin of a light-emitting diode of the photo-interrupter 2; one terminal of the second capacitor C2 is connected to a collector pin of a photoelectric triode of the photo-interrupter 2, one terminal of the second resistor R2 and a second serial input-output port of the main control chip U1.

The other terminal of the second resistor R2 is connected to the supply terminal of the power supply module 4, and the other terminal of the second capacitor C2, a negative pin of the light-emitting diode of the photo-interrupter 2 and an emitter pin of the photoelectric triode of the photo-interrupter 2 are all grounded.

The connecting circuit of the main control chip U1 and the photo-interrupter 2 is described above. The main control chip U1 supplies power to the light-emitting diode of the photo-interrupter 2 via the first serial input-output port to enable the light-emitting diode to emit light and receives an electric signal from the photoelectric triode of the photo-interrupter 2 via the second serial input-output port. The frequency of the electric signal changes as follows: when rotating along with the bearing 6, the grating wheel 3 repeatedly reflects light from the photo-interrupter 2 onto the photoelectric triode to cause changes to the electric signal output by the photoelectric triode, that is, the rotation frequency of the bearing 6 changes.

Figure 5:
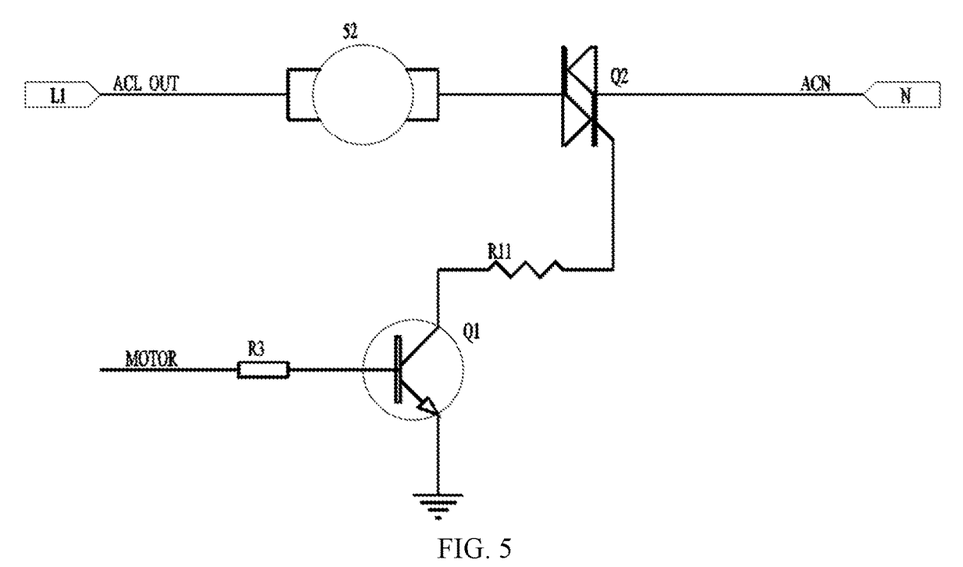
FIG. 5 is a circuit diagram of a bearing drive module of the automatic stop device for a can opener, according to one embodiment of the invention.

Furthermore, the bearing 6 drive module 5 comprises a drive motor 7, a drive gear assembly 8, a first triode Q1, a thyristor Q2, a third resistor R3 and a fourth resistor R4.

One terminal of the third resistor R3 is connected to a third serial input-output port of the main control chip U1, and the other terminal of the third resistor R3 is connected to a base of the first triode Q1; one terminal of the fourth resistor R4 is connected to a collector of the first triode Q1, and the other terminal of the fourth resistor R4 is connected to a power control electrode of the thyristor Q2; a positive electrode of the thyristor Q2 is connected to a negative electrode of the drive motor 7, and a positive electrode of the drive motor 7 is connected to the supply terminal of the power supply module 4.

An emitter of the first triode Q1 and a negative electrode of the thyristor Q2 are both grounded, the bearing 6 is assembled on the drive motor 7, one end of the drive gear assembly 8 is disposed around the bearing 6, the other end of the drive gear assembly 8 is fixedly connected to the can opener blade, and both the first triode Q1 and the thyristor Q2 are of an NPN type.

From the above description, when the bearing needs to be controlled to drive the can opener blade to rotate, the main control chip U1 outputs a high level via the third serial input-output port to sequentially turn on the first triode Q1 and the thyristor Q2. The supply terminal of the power supply module 4 output a value to the drive motor 7 to enable the drive motor 7 to drive the bearing 6 to rotate, and then, the can opener blade starts to rotate.

Figure 6:
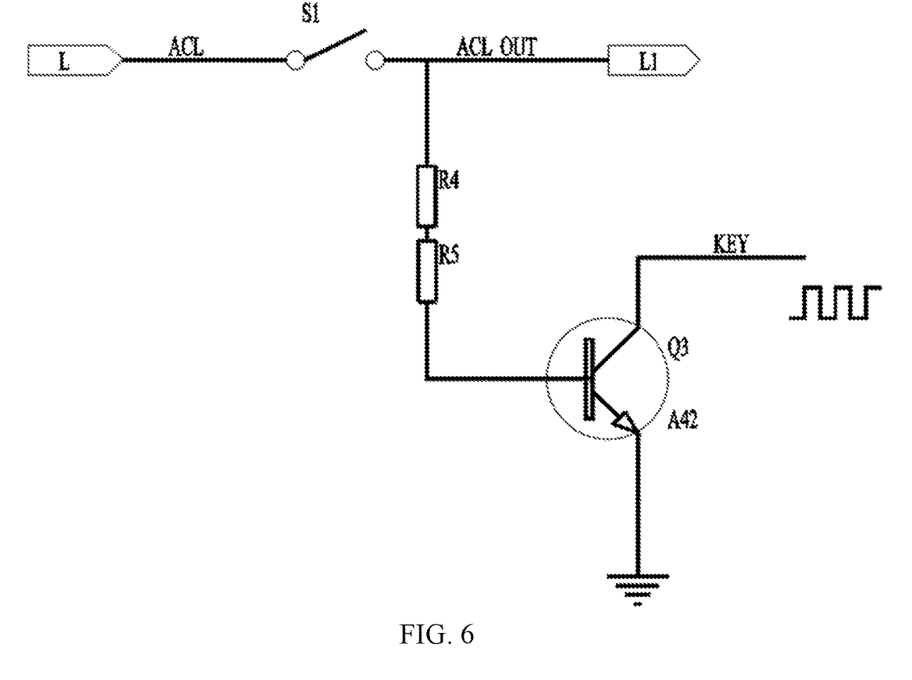
FIG. 6 is a circuit diagram of a key switch module of the automatic stop device for a can opener, according to one embodiment of the invention.

Furthermore, the automatic stop device further comprises a key switch module 9 comprising a key switch S1, a second triode Q3, a fourth resistor R4 and a fifth resistor R5, wherein the configuration that the positive electrode of the drive motor 7 is connected to the supply terminal of the power supply module 4 is replaced with:

One terminal of the key switch S1 is connected to the supply terminal of the power supply module 4, and the other terminal of the key switch S1 is connected to the positive electrode of the drive motor 7 and one terminal of the fourth resistor R4; the other terminal of the fourth resistor R4 is connected to one terminal of the fifth resistor R5, the other terminal of the fifth resistor R5 is connected to a base of the second triode Q3, and a collector of the second triode Q3 is connected to a fourth serial input-output port of the main control chip U1.

An emitter of the second triode Q3 is grounded, and the second triode Q3 is of an NPN type.

From the above description, the key switch module 9 is additionally disposed between the drive motor 7 and the power supply module 4. The fourth serial input-output port of the main control chip U1 is connected to the collector of the second triode Q3. Only when the key switch S1 is pressed, the supply terminal of the power supply module 4 will output a value to the drive motor 7, the second triode Q3 will be turned on, and the main control chip U1 will receive an electric signal from the key switch module 9 to control the drive motor 7 to work.

An automatic stop method or device for a can opener in the following embodiment is suitable for a lateral-cut can opener and can automatically stop lateral cutting carried out on different cans.

Referring to FIG. 1, Embodiment 1 of the invention is as follows:

An automatic stop method for a can opener comprises the following steps:

S1: a can opener is started, multiple rotation frequencies of a bearing 6 are acquired in a first preset time, and a mean value of the multiple rotation frequencies is calculated and is regarded as a first frequency, wherein the bearing 6 is used for driving a can opener blade to rotate;

S2: multiple rotation frequencies of the bearing 6 are acquired within each second preset time after the first preset time, and a mean value of the multiple rotation frequencies is calculated and is regarded as a second frequency; and S3: whether or not a difference between the second frequency and the first frequency is greater than a preset value is determined; if so, the can opener blade is stopped; or if not, Step S2 is performed.

In this embodiment, the preset vale is obtained specifically as follows:

When the can opener blade is used to open different cans, first rotation frequencies of the bearing 6 during primary cutting and second rotation frequencies of the bearing 6 during repeated cutting are acquired, and a difference between the first rotation frequency and the second rotation frequency corresponding to each can is calculated to obtain a frequency difference corresponding to each can.

A mean value of all frequency differences is calculated and is multiplied by a preset coefficient to obtain the preset value, wherein the range of the preset value is (0,1). Specifically, a formula for calculating the mean value of all the frequency differences is as follows:

$$\theta=[(H1-G1)+(H2-G2)+(H3-G3)+\ldots+(Hm-Gm)]\div m$$

Wherein, $\theta$ is the mean value of all the frequency differences; G1, G2, G3 ... Gm are corresponding first rotation frequencies when the can opener blade laterally cuts different cans; H1, H2, H3 ... Hm are corresponding second rotation frequencies when the can opener blade laterally cuts different cans; m is the number of the cans.

In this embodiment, in Step S1, the can opener is started specifically through the following sub-steps:

Whether or not a key switch S1 is constantly in an on state within a third preset time is determined; if so, the can opener blade is driven to rotate, and a rotation time is recorded.

After Step S3, the method further comprises the following step:

S4: whether or not the rotation time is greater than a maximum can opening cycle is determined; if so, the can opener blade is stopped, wherein the maximum can opening cycle is greater than the sum of the first preset time and the second preset time.

From the above description, the can opener blade will not start to rotate unless the key switch S1 is long pressed by a user. When the rotation time of the can opener blade reaches the maximum can opening cycle, the can opener blade will stop even if the key switch S1 is still pressed by the user.

The principle of this embodiment is as follows: regarding a lateral-cut can opener, a resistance will be generated when the can opener blade cuts a sealing or covering edge of a can for the first time. At this moment, the bearing 6 on the bearing drive module 5 will drive the can opener blade to rotate, and the rotation frequency of the bearing 6 will be stabilized at a frequency value, namely the first frequency mentioned in this embodiment; at the same time, a V-shaped cutting slot will be formed in the side edge of the can and is defined as a V-slot track. If the can opener blade does not stop when the can opener finishes one can opening process, the can opener blade will rotate along the original V-slot track again. In this case, the resistance encountered by the can opener blade will be smaller than the resistance during primary can opening, and the rotation frequency of the bearing 6 will change to another rotation frequency value accordingly, namely the second frequency in this embodiment. The conclusion that the second frequency is certainly greater than the first frequency is drawn by repeated verification. Thus, for the same can opener, an experiment corresponding to the preset value is carried out in advance in this embodiment, and the obtained preset value is used as a criterion of the difference between the second frequency and the first frequency. Afterwards, Step S1 to Step S3 are performed in an actual can opening process to determine the time when repeated cutting of the can opener blade occurs so as to stop the can opener blade, so that the problems caused by repeated cutting are avoided.

In addition, in this embodiment, when a second preset time is divided by a time point, when repeated cutting happens to the can opener blade, into a time period before repeated cutting and a time period after repeated cutting, if the time period before repeated cutting accounts for a large proportion of the second preset time, the second frequency obtained by calculating a mean value in the time period after repeated cutting will not meet the condition that the difference between the second frequency and the first frequency is greater than the preset value, which will lead to a misjudgment that repeated cutting does not occur in the second preset time. To avoid this circumstance, the preset value is multiplied by a preset coefficient (0, 1) in this embodiment to reduce errors caused by this circumstance. The specific value of the preset coefficient can be set according to the actual condition.

Referring to FIG. 1, Embodiment 2 of the invention is as follows:

On the basis of Embodiment 1, Step S1 of the automatic stop method for a can opener specifically comprises:

S1: the can opener is started, the first preset time is divided into multiple equal first preset intervals, the rotation frequency of the bearing 6 is acquired in each first preset interval, and a mean value of all acquired rotation frequencies, except the maximum one and the minimum one, of the bearings 6 is calculated to obtain the first frequency, wherein the bearing 6 is used for driving the can opener blade to rotate, and the rotation frequency of the bearing 6 acquired in each first preset interval is a constant value or a mean value of multiple rotation frequencies.

Step S2 specifically comprises:

S2: each second preset time after the first preset time is divided into multiple equal second preset intervals, the rotation frequency of the bearing 6 is acquired in each second preset interval, and a mean value of all acquired rotation frequencies of the bearing 6 is calculated to obtain the second frequency, wherein the rotation frequency of the bearing 6 acquired in each second preset interval is a constant value or a mean value of multiple rotation frequencies.

In this embodiment, assume the maximum can opening cycle is T, the first preset time is T/4 and the second preset time is T/10, one specific application process of this embodiment is as follows:

In one can opening cycle T, the first preset time is T/4 and is divided into n equal first preset intervals. Wherein, n may be set as actually needed. Within the 1/4T time, rotation frequency data of the bearing 6 in each preset interval is divided into n sets, wherein a first set of data is defined as x1, a second set of data is defined as x2, a third set of data is defined as x3, ..., and an n set of data is defined as xn; each set of data may be a constant value or a mean value obtained by sampling. Then, the maximum value and the minimum value are removed, and calculation is carried out according to the following formula:

$$f1=[x1+x2+x3+\ldots+x(n-2)]\div(n-2)$$

Wherein, f1 is the first frequency.

Next, within the remaining time of the cycle T, five sets of data are acquired in every T/10 time, and each set of data may be a constant value or a mean value obtained by sampling. A first set of data is defined as y1, a second set of data is defined as y2, . . . , and a five set of data is defined as y5; calculation is carried out according to the following formula:

$$f2=[y1+y2+ \ldots +y5] \div 5$$

Wherein, f2 is the second frequency.

Finally, whether or not a difference between the second frequency and the first frequency is greater than a preset value is determined by calculation; if so, the can open blade is stopped; or if not, a new second frequency is acquired in the next T/10 time, and the calculation and determination are carried out again.

Figure 2:
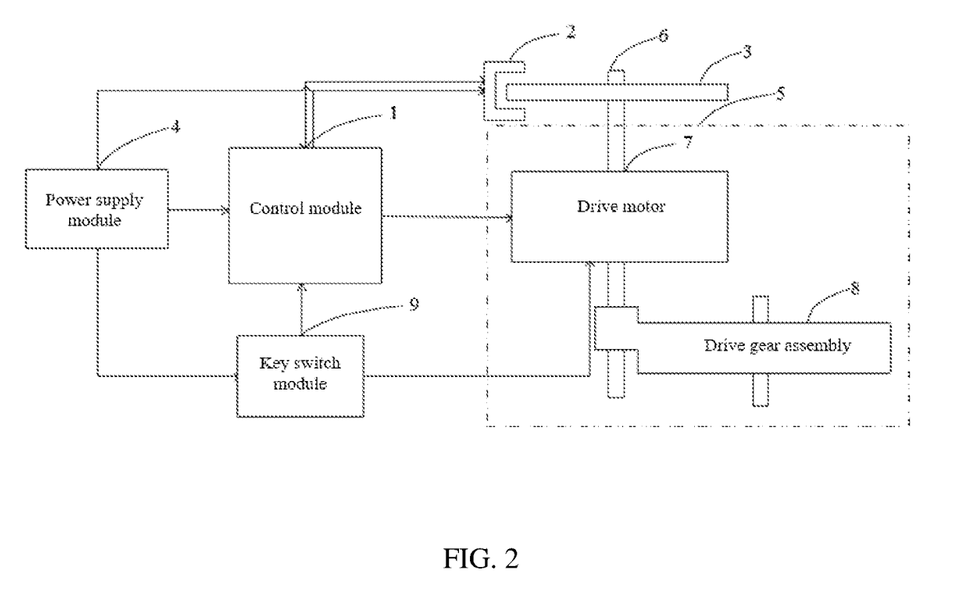
FIG. 2 is an overall structural view of an automatic stop device for a can opener, according to one embodiment of the invention.
Figure 7:
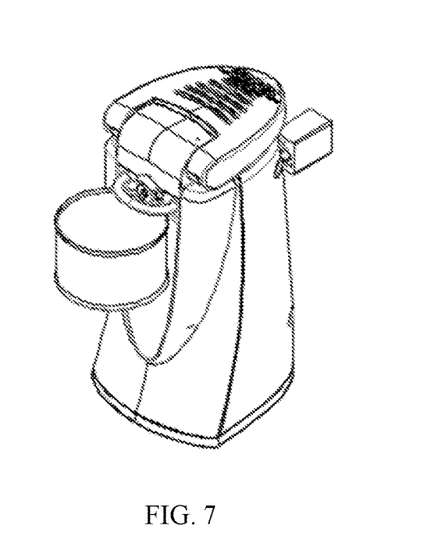
FIG. 7 is a structural view of the automatic stop device for a can opener, according to one embodiment of the invention.
Figure 8:
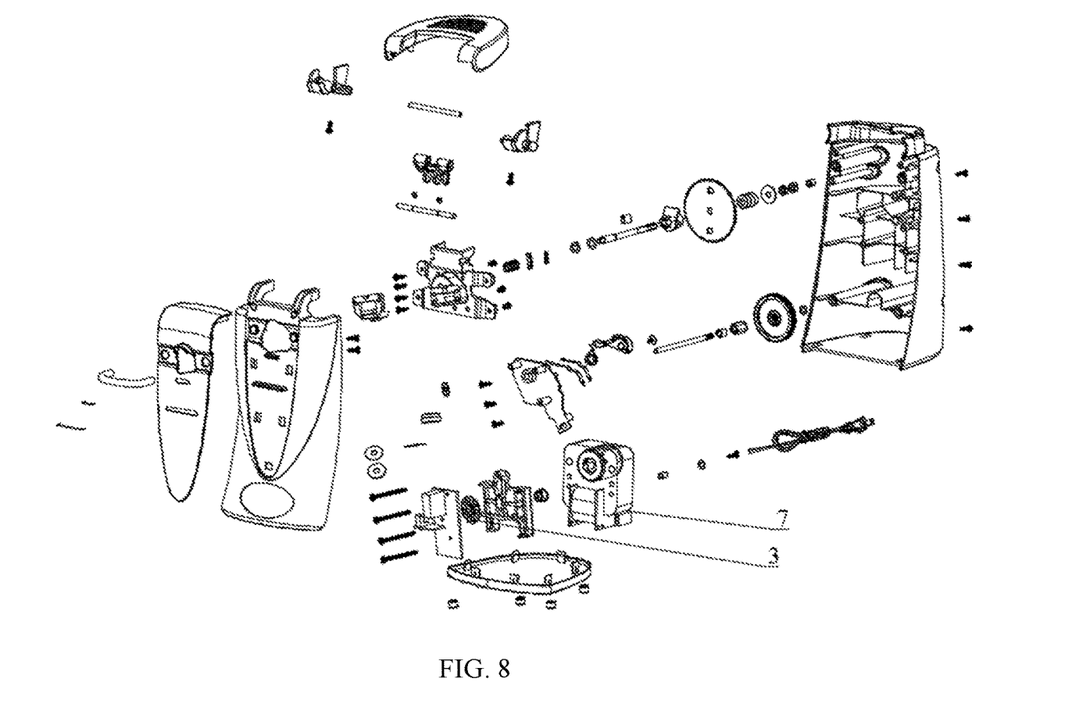
FIG. 8 is an exploded view of the automatic stop device for a can opener, according to one embodiment of the invention.

Referring to FIG. 2, FIG. 7 and FIG. 8, Embodiment 3 of the invention is as follows:

An automatic stop device for a can opener comprises a control module 1, a photo-interrupter 2, a grating wheel 3, a power supply module 4, a bearing drive module 5 provided with a bearing 6, and a can opener blade.

The control module 1 is electrically connected to the power supply module 4, the bearing drive module 5 and the photo-interrupter 2, the power supply module 4 is electrically connected to the bearing drive module 5 and the photo-interrupter 2, the grating wheel 3 is disposed around the bearing 6, the movement track of the grating wheel 3 passes through a photoelectric detection region of the photo-interrupter 2, and the bearing 6 is fixedly connected to the can opener blade.

The bearing 6 drives the grating wheel 3 to rotate, and the control module 1 is used to implement an automatic stop method for a can opener according to Embodiment 1.

In this embodiment, every time the grating wheel 3 rotates along with the bearing 6 by one complete circle, it will reflect light from the photo-interrupter 2 to enable the illumination intensity of the photo-interrupter 2 to vary along with the rotation of the grating wheel 3, and then the photo-interrupter 2 will output an electric signal representing the corresponding variation. The control module 1 can obtain the rotation frequency and changes thereof of the bearing 6 according to the electric signal.

Referring to FIG. 3 and FIG. 6, Embodiment 4 of the invention is as follows:

On the basis of Embodiment 3, the control module 1 of the automatic stop device for a can opener comprises a main control chip U1 and a first capacitor C1, as shown in FIG. 4. Wherein, one terminal of the first capacitor C1 is connected to a supply voltage input pin of the main control chip U1 and a supply terminal of the power supply module 4, and the other terminal of the first capacitor C1 is connected to a ground pin of the main control chip U1.

As shown in FIG. 3 and FIG. 4, the automatic stop device further comprises a first resistor R1, a second resistor R2 and a second capacitor C2. Wherein, one terminal of the first resistor R1 is connected to a first serial input-output port of the main control chip U1, and the other terminal of the first resistor R1 is connected to a positive pin of a light-emitting diode of the photo-interrupter 2; one terminal of the second capacitor C2 is connected to a collector pin of a photoelectric triode of the photo-interrupter 2, one terminal of the second resistor R2 and a second serial input-output port of the main control chip U1.

The other terminal of the second resistor R2 is connected to the supply terminal of the power supply module 4, and the other terminal of the second capacitor C2, a negative pin of the light-emitting diode of the photo-interrupter 2 and an emitter pin of the photoelectric triode of the photo-interrupter 2 are all grounded.

A connecting circuit of the main control chip U1 and the photo-interrupter 2 is described above. The main control chip U1 supplies power to the light-emitting diode of the photo-interrupter 2 via the first serial input-output port to enable the light-emitting diode to emit light and receives an electric signal from the photoelectric triode of the photo-interrupter 2 via the second serial input-output port. The frequency of the electric signal changes as follows: when rotating along with the bearing 6, the grating wheel 3 repeatedly reflects light from the photo-interrupter 2 onto the photoelectric triode to cause changes to the electric signal output by the photoelectric triode, that is, the rotation frequency of the bearing 6 changes.

As shown in FIG. 3 and FIG. 5, the bearing drive module 5 comprises a drive motor 7, a drive gear assembly 8, a first triode Q1, a thyristor Q2, a third resistor R3 and a fourth resistor R4. Wherein, one terminal of the third resistor R3 is connected to a third serial input-output port of the main control chip U1, and the other terminal of the third resistor R3 is connected to a base of the first triode Q1; one terminal of the fourth resistor R4 is connected to a collector of the first triode Q1, and the other terminal of the fourth resistor R4 is connected to a base of the thyristor Q2, a collector of the thyristor Q2 is connected to a negative electrode of the drive motor 7, and a positive electrode of the drive motor 7 is connected to the supply terminal of the power supply module 4.

An emitter of the first triode Q1 and an emitter of the second triode are both grounded, the bearing 6 is assembled on the drive motor 7, one end of the drive gear assembly 8 is disposed around the bearing 6, the other end of the drive gear assembly 8 is fixedly connected to the can opener blade, and the first triode Q1 is of an NPN type.

As shown in FIG. 3, FIG. 5 and FIG. 6, the automatic stop device further comprises a key switch module 9 comprising a key switch, a second triode Q3, a fourth resistor R4 and a fifth resistor R5, wherein the configuration that the positive electrode of the drive motor 7 is connected to the supply terminal of the power supply module 4 is replaced with:

One terminal of the key switch S1 is connected to the supply terminal of the power supply module 4, and the other terminal of the key switch S1 is connected to a positive electrode of the drive motor 7 and one terminal of the fourth resistor R4; the other terminal of the fourth resistor R4 is connected to one terminal of the fifth resistor R5, the other terminal of the fifth resistor R5 is connected to a base of the second triode Q3, and a collector of the second triode Q3 is connected to a fourth serial input-output port of the main control chip U1.

An emitter of the second triode Q3 is grounded, and the second triode Q3 is of an NPN type.

Specific circuit connection of the automatic stop device for a can opener in this embodiment is described above. One specific application process of this embodiment is as follows:

If a user presses the key switch S1 for a long time, the fourth serial input-output port of the main control chip U1 will detect a square signal (50-60 hz), and at this moment, the first serial input-output port of the main control chip U1 outputs a high level to start the photo-interrupter 2. At the same time, the third serial input-output port of the main control chip U1 outputs a high level to sequentially turn on the first triode Q1 and the thyristor Q2 to start the drive motor 7. After being started, the drive motor 7 drives the grating wheel 3 on the bearing 6 to rotate. When the can open blade is started or stopped, the main control chip U1 will receive frequency signals from the photo-interrupter 2 within the first preset time and the second preset time, and data processing in Embodiment 1 or 2 will be carried out. When acquired data meets the condition mentioned in Step S3 in the above embodiment, the main control chip U1 will stop the drive motor 7, and the can opener blade will stop, accordingly.

In this embodiment, the power supply module 4 supplies power in cooperation with a voltage-stabilizing diode through a low-cost RC voltage reduction method. In other equivalent embodiments, the power supply module 4 may be replaced with an isolated or non-isolated switch power supply and DC-DC voltage reduction or LDO voltage reduction.

In this embodiment, the main control chip U1 is a 8-bit single-chip microcomputer simply packaged by sop-8 In other equivalent embodiments, the main control chip U1 may be a 8-bit, 16-bit or 32-bit single-chip microcomputer and may be packaged in different manners.

As shown in FIG. 7 and FIG. 8 which are specific design diagrams of the invention, the components such as the grating wheel 3 and the drive motor 7 are all arranged inside.

In addition, in other equivalent embodiments, the thyristor Q2 of the bearing drive motor 5 may also be replaced with a thyristor Q2 of a different model or a relay, which can control the drive motor 7 to work or stop.

To sum up, according to the automatic stop method and device for a can opener, when a first rotation frequency of the bearing in a first preset time is smaller than a second rotation frequency of the bearing in a subsequent second preset time in the process of opening a can by the can opener blade and the difference between the second frequency and the first frequency reaches a preset value, it is determined that repeated cutting occurs, and the blade will be stopped in time. In addition, to satisfy the requirement of algorithmic processing, mean values of multiple data acquired within the first preset time and the second preset time are calculated, and the mean value of all rotation frequencies, except the maximum one and the minimum one, of the bearing acquired within the first preset time is calculated, so that the accuracy of the first frequency and the second frequency is further improved. The preset value is determined according to experimental experience and data, so that the reliability of the preset value used as a criterion is improved, and the problems caused by repeated cutting can be effectively avoided when the lateral-cut can opener opens a can.

The above embodiments are merely illustrative ones of the invention, and are not intended to limit the patent scope of the invention. All equivalent transformations obtained according to the contents in the description and accompanying drawings of the invention, or direct or indirect applications to relating technical fields should also fall within the protection scope of the invention.

What is claimed is:

1. An automatic stop device for a can opener, comprising a control module, a photo-interrupter, a grating wheel, a power supply module, a bearing drive module provided with a bearing, and a can opener blade, wherein:
   the control module is electrically connected to the power supply module, the bearing drive module and the photo-interrupter, the power supply module is electrically connected to the bearing drive module and the photo-interrupter, the grating wheel is disposed around the bearing, a moving track of the grating wheel passes through a photoelectric detection region of the photo-interrupter, and the bearing is fixedly connected to the can opener blade;
   the bearing drives the grating wheel to rotate, and the control module is configured to:
   start the can opener, acquire multiple rotation frequencies of the bearing within a first preset time, calculate a mean value of the multiple rotation frequencies, and regard the mean value as a first frequency, wherein the bearing is used for driving the can opener blade to rotate;
   acquire multiple rotation frequencies of the bearing within each second preset time after the first preset time, calculate a mean value of the multiple rotation frequencies, and regard the mean value as a second frequency; and
   determine whether or not a difference between the second frequency and the first frequency is greater than a preset value; if so, stop the can opener blade; or if not, acquire multiple rotation frequencies of the bearing within each second preset time after the first preset time, calculate the mean value of the multiple rotation frequencies, and regard the mean value as the second frequency.

2. The automatic stop device for a can opener according to claim 1, wherein the control module comprises a main control chip and a first capacitor;
   one terminal of the first capacitor is electrically connected to a supply voltage input pin of the main control chip and a supply terminal of the power supply module, and another terminal of the first capacitor is connected to a ground pin of the main control chip.

3. The automatic stop device for a can opener according to claim 2, further comprising a first resistor, a second resistor and a second capacitor, wherein:
   one terminal of the first resistor is connected to a first serial input-output port of the main control chip, another terminal of the first resistor is connected to a positive pin of a light-emitting diode of the photo-interrupter, one terminal of the second capacitor is connected to a collector pin of a photoelectric triode of the photo-interrupter, one terminal of the second resistor and a second serial input-output port of the main control chip;
   another terminal of the second resistor is connected to the supply terminal of the power supply module, and another terminal of the second capacitor, a negative pin of the light-emitting diode of the photo-interrupter and an emitter pin of the photoelectric triode of the photo-interrupter are all grounded.

4. The automatic stop device for a can opener according to claim 2, wherein the bearing drive module comprises a drive motor, a drive gear, a first triode, a thyristor, a third resistor and a fourth resistor;
   one terminal of the third resistor is connected to a third serial input-output port of the main control chip, and another terminal of the third resistor is connected to a base of the first triode; one terminal of the fourth resistor is connected to a collector of the first triode, and another terminal of the fourth resistor connected to a power control electrode of the thyristor; a positive electrode of the thyristor is connected to a negative electrode of the drive motor, and a positive electrode of the drive motor is connected to the supply terminal of the power supply module;
   an emitter of the first triode and a negative electrode of the thyristor are both grounded, the bearing is assembled on the drive motor, the drive gear has an end disposed around the bearing and an end fixedly connected to the can opener blade, and the first triode is of an NPN type.

5. The automatic stop device for a can opener according to claim 4, further comprising a key switch, a second triode, a fourth resistor and a fifth resistor, wherein the configuration that the positive electrode of the drive motor is connected to the supply terminal of the power supply module is replaced with:

one terminal of the key switch is connected to the supply terminal of the power supply module, and another terminal of the key switch is connected to the positive electrode of the drive motor and one terminal of the fourth resistor; another terminal of the fourth resistor is connected to one terminal of the fifth resistor, another terminal of the fifth resistor is connected to a base of the second triode, and a collector of the second triode is connected to a fourth serial input-output port of the main control chip;

an emitter of the second triode is grounded, and the second triode is of an NPN type.

6. The automatic stop device for a can opener according to claim 1, wherein the control module is further configured to:

when the can opener blade is used to open different cans, acquire rotation frequencies of the bearing during primary cutting and second rotation frequencies of the bearing during repeated cutting, and calculate a difference between the first rotation frequency and the second rotation frequency corresponding to each of the cans so as to obtain a frequency difference corresponding to each of the cans; and calculate a mean value of all the frequency differences, and multiply the mean value by a preset coefficient to obtain the preset value, wherein the range of the preset coefficient is (0, 1).

7. The automatic stop device for a can opener according to claim 1, further comprising a key switch, wherein the control module determines whether or not the key switch is constantly in an on state within a third preset time; if so, drives the can opener blade to rotate, and records a rotation time; and the control module determines whether or not the rotation time is greater than a maximum can opening cycle; if so, stops the can opener blade, wherein the maximum can opening cycle is greater than the sum of the first preset time and the second preset time.

8. The automatic stop device for a can opener according to claim 7, wherein if the maximum can opening cycle is defined as T, the first preset time is (0, T/4], and the second preset time is (0, T/10].

9. The automatic stop device for a can opener according to claim 1, wherein the control module starts the can opener, divides the first preset time into multiple equal first preset intervals, acquires a rotation frequency of the bearing in each of the first preset intervals, and calculates a mean value of all acquired rotation frequencies, except a maximum one and a minimum one, of the bearings to obtain the first frequency, wherein the bearing is used for driving the can opener blade to rotate, and the rotation frequency of the bearing acquired in each of the first preset intervals is a constant value or a mean value of multiple rotation frequencies; and the control module divides each second preset time after the first preset time into multiple equal second preset intervals, acquires a rotation frequency of the bearing in each of the second preset intervals, and calculates a mean value of all acquired rotation frequencies of the bearing to obtain the second frequency, wherein the rotation frequency of the bearing acquired in each of the second preset intervals is a constant value or a mean value of multiple rotation frequencies.

* * * * *